United States Patent
Jiang et al.

(10) Patent No.: US 11,665,685 B2
(45) Date of Patent: May 30, 2023

(54) METHOD FOR DATA PROCESSING, USER EQUIPMENT, AND NETWORK-SIDE DEVICE

(71) Applicant: VIVO MOBILE COMMUNICATION CO., LTD., Guangdong (CN)

(72) Inventors: Dajie Jiang, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 197 days.

(21) Appl. No.: 17/110,165

(22) Filed: Dec. 2, 2020

(65) Prior Publication Data

US 2021/0092751 A1 Mar. 25, 2021

Related U.S. Application Data

(63) Continuation of application No. PCT/CN2019/089154, filed on May 30, 2019.

(30) Foreign Application Priority Data

Jun. 13, 2018 (CN) .......................... 201810610167.8

(51) Int. Cl.
*H04W 72/12* (2023.01)
*H04W 76/27* (2018.01)
*H04W 72/23* (2023.01)

(52) U.S. Cl.
CPC ........... *H04W 72/12* (2013.01); *H04W 72/23* (2023.01); *H04W 76/27* (2018.02)

(58) Field of Classification Search
CPC ......... H04W 72/1205; H04W 72/1289; H04W 76/27
See application file for complete search history.

(56) References Cited

U.S. PATENT DOCUMENTS

| 11,252,668 | B2 * | 2/2022 | Nory | ................. H04W 52/0235 |
| 2016/0262144 | A1 | 9/2016 | Kitazoe et al. | |
| 2017/0367046 | A1 * | 12/2017 | Papasakellariou | ........................... H04W 72/0446 |
| 2019/0297577 | A1 * | 9/2019 | Lin | ................... H04W 52/0235 |

(Continued)

FOREIGN PATENT DOCUMENTS

| CN | 106817774 A | 6/2017 |
| WO | 2018/054373 A1 | 3/2018 |

(Continued)

OTHER PUBLICATIONS

Mediatek Inc., 'Cross-Slot Scheduling in NR', R1-1609556, 3GPP TSG RAN WG1 Meeting #86bis, Lisbon, Portugal, Oct. 10-14, 2016.

(Continued)

*Primary Examiner* — Melanie Jagannathan
(74) *Attorney, Agent, or Firm* — Maschoff Brennan

(57) ABSTRACT

Embodiments of this disclosure provide a method for data processing, user equipment, and a network-side device. The method includes: sending a first parameter for cross-slot scheduling to a network-side device; determining a second parameter for cross-slot scheduling of the UE, where the second parameter is the first parameter, or the second parameter is corresponding to the first parameter; and performing, based on the second parameter, data processing related to cross-slot scheduling.

20 Claims, 10 Drawing Sheets

(56) References Cited

U.S. PATENT DOCUMENTS

| | | | |
|---|---|---|---|
| 2019/0312635 A1* | 10/2019 | Ang | H04L 5/001 |
| 2020/0037184 A1 | 1/2020 | Harada et al. | |
| 2020/0059904 A1* | 2/2020 | Takeda | H04L 5/001 |
| 2020/0252978 A1* | 8/2020 | Yi | H04L 5/0044 |
| 2020/0344034 A1* | 10/2020 | Moon | H04L 5/0098 |

FOREIGN PATENT DOCUMENTS

| | | |
|---|---|---|
| WO | 2018/066923 A1 | 4/2018 |
| WO | 2018062458 A1 | 4/2018 |
| WO | 2018084138 A1 | 5/2018 |

OTHER PUBLICATIONS

NTT DOCOMO, Inc., 'Data Scheduling and HARQ-ACK Feedback Procedures for NR', R1-1700625, 3GPP TSG RAN WG1 AH_NR Meeting, Spokane, USA, Jan. 16-20, 2017.

Samsung, 'Discussion on Beam Indication for PDSCH', R1-1717612, 3GPP TSG RAN WG1 Meeting #90bis, Prague, Czech, Oct. 9-13, 2017.

Chinese Office Action issued in corresponding application No. 201810610167.8, dated May 6, 2020.

International Search Report and Written Opinion issued in corresponding application No. PCT/CN2019/089154, dated Dec. 24, 2020.

KR Office Action dated Jun. 24, 2021 as received in Application No. 10-2020-7035948.

Indian Office Action dated Jan. 4, 2022 as received in application No. 202027056924.

"Remaining Details on Bandwidth Part Operation in NR" 3GPP TSG RAN WG1 Meeting 90bis, R1-1718327 Prague, CZ, Oct. 9-13, 2017, MediaTek Inc.

Japanese Office Action dated Jan. 17, 2022 as received in application No. 2020-569042.

"HARQ feedback timing for NR" 3GPP TSG RAN WG1 NR Ad Hoc Meeting, R1-1709970, Qiagdao, China. Jun. 27, 2017. Huawei, HiSilicon.

"Open Issues on BWP" 3GPP TSG RAN WG1 #91, R1-1720693, Reno, Nevada. Nov. 27, 2017. Qualcomm Incorporated.

Samsung, "On Number of HARQ Processes," 3GPP TSG RAN WG1 Meeting #89, R1-1708029, pp. 1-3, (May 2017).

JP Office Action dated May 30, 2022 as received in Application No. 2020-569042.

\* cited by examiner

METHOD FOR DATA PROCESSING, USER EQUIPMENT, AND NETWORK-SIDE DEVICE

CROSS-REFERENCE TO RELATED APPLICATIONS

This application is a continuation application of International Application No. PCT/CN2019/089154 filed on May 30, 2019, which claims priority to Chinese Patent Application No. 201810610167.8 filed in China on Jun. 13, 2018, both disclosures of which are incorporated herein by reference in their entireties.

TECHNICAL FIELD

Embodiments of this disclosure relate to the field of communications technologies, and in particular, to a method for data processing, user equipment, and a network-side device.

BACKGROUND

The standard Release 15 (R15) of new radio (NR) supports cross-slot scheduling. The principle of cross-slot scheduling is that there are N slots between a physical downlink control channel (PDCCH) and a physical downlink shared channel (PDSCH) or a physical uplink shared channel (PUSCH) scheduled by the PDCCH, where the PDSCH may be configured with K0 slots, the PUSCH may be configured with K2 slots, and K0 and K2 are configured by a base station and indicated by downlink control information (DCI). K0 indicates a time interval between the PDCCH and the PDSCH scheduled by the PDCCH; and K2 indicates a time interval between the PDCCH and the PUSCH scheduled by the PDCCH.

The advantage of cross-slot scheduling of the PDSCH is that user equipment (UE) does not need to buffer PDSCH data in advance; after decoding of the PDCCH, the UE receives the PDSCH data based on an indication of the PDCCH; and the UE can selectively switch on or off a radio frequency (RF) module and a base band (BB) module, thereby achieving an effect of power saving.

A standard in related technologies supports cross-slot scheduling, and a base station can configure a cross-slot scheduling parameter for UE: K0 value, K1 value or K2 value, where K1 indicates a time interval between a PDSCH and an acknowledgement (ACK) message or a negative acknowledgement (NACK) message on a corresponding PUCCH. However, the value of K0, K1 or K2 configured by the base station may be inappropriate for the UE to save power. For example, the value of K0, K1 or K2 configured by the base station are too small to achieve the UE's purpose of saving power.

In addition, the standard in the related technologies supports the UE in reporting two processing capabilities (UE processing capability 1 and UE processing capability 2). The capabilities are related to a processing time (processing time) of the UE, and each capability is corresponding to a different PDSCH processing delay (N1) and a different PUSCH preparation delay (N2). However, in some cases (for example, in a case in which power is exhausted soon), the UE cannot adjust its processing capabilities, which prevents the UE from saving power.

SUMMARY

An objective of embodiments of this disclosure is to provide a method for data processing, user equipment, and a network-side device, so as to resolve a problem of ineffective power saving control of UE.

According to a first aspect, a method for data processing is provided and applied to UE, where the method includes:

sending a first parameter for cross-slot scheduling to a network-side device;

determining a second parameter for cross-slot scheduling of the UE, where the second parameter is the first parameter, or the second parameter is corresponding to the first parameter; and performing, based on the second parameter, data processing related to cross-slot scheduling.

According to a second aspect, a method for data processing is further provided and applied to a network-side device, where the method includes:

receiving a first parameter for cross-slot scheduling from UE; and sending, to the UE, feedback information in response to the first parameter, so that the UE performs, based on the feedback information, data processing related to cross-slot scheduling.

According to a third aspect, a method for data processing is further provided and applied to UE, where the method includes:

reporting, to a network-side device, a first UE capability or a third parameter corresponding to a first UE capability;

determining a fourth parameter for cross-slot scheduling of the UE, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and performing, based on the fourth parameter, data processing related to cross-slot scheduling, wherein a current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

According to a fourth aspect, a method for data processing is further provided and applied to a network-side device, where the method includes:

receiving a first UE capability or a third parameter corresponding to a first UE capability that is reported by UE;

determining a fourth parameter of the UE based on the first UE capability or the third parameter corresponding to the first UE capability, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and sending the fourth parameter to the UE, where a current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

According to a fifth aspect, UE is further provided, including:

a first sending module, configured to send a first parameter for cross-slot scheduling to a network-side device;

a first determining module, configured to determine a second parameter for cross-slot scheduling of the UE, where the second parameter is the first parameter, or the second parameter is corresponding to the first parameter; and a first processing module, configured to perform, based on the second parameter, data processing related to cross-slot scheduling.

According to a sixth aspect, a network-side device is further provided, including:

a second receiving module, configured to receive a first parameter for cross-slot scheduling from UE; and a second sending module, configured to send, to the UE, feedback information in response to the first parameter, so that the UE performs, based on the feedback information, data processing related to cross-slot scheduling.

According to a seventh aspect, UE is further provided, including:

a third sending module, configured to report, to a network-side device, a first UE capability or a third parameter corresponding to a first UE capability;

a second determining module, configured to determine a fourth parameter for cross-slot scheduling of the UE, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and a second processing module, configured to perform, based on the fourth parameter, data processing related to cross-slot scheduling, wherein a current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

According to an eighth aspect, a network-side device is further provided, including:

a fourth receiving module, configured to receive a first UE capability or a third parameter corresponding to a first UE capability that is reported by UE;

a third determining module, configured to determine a fourth parameter of the UE based on the first UE capability or the third parameter corresponding to the first UE capability, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and a fourth sending module, configured to send the fourth parameter to the UE, where a current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

According to a ninth aspect, UE is further provided, including: a processor, a memory, and a computer program stored in the memory and capable of running on the processor, where when the computer program is executed by the processor, the steps of the method for data processing according to the first aspect are implemented, or the steps of the method for data processing according to the third aspect are implemented.

According to a tenth aspect, a network-side device is further provided, including: a processor, a memory, and a computer program stored in the memory and capable of running on the processor, where when the computer program is executed by the processor, the steps of the method for data processing according to the second aspect are implemented, or the steps of the method for data processing according to the fourth aspect are implemented.

According to an eleventh aspect, a computer-readable storage medium is further provided. The computer-readable storage medium stores a computer program, and when the computer program is executed by a processor, the steps of the method for data processing according to the first aspect, the second aspect, the third aspect, or the fourth aspect are implemented.

According to the embodiments of this disclosure, the UE can perform, based on a reported related parameter for cross-slot scheduling, data processing related to cross-slot scheduling, so that the data processing related to cross-slot scheduling meets a power saving requirement of the UE, thereby achieving a better power saving effect.

BRIEF DESCRIPTION OF DRAWINGS

Other advantages and benefits will become apparent to those of ordinary skill in the art by reading detailed description of the optional embodiments below. The accompanying drawings are merely intended to illustrate the objectives of the optional embodiments and are not intended to limit this disclosure. Throughout the accompanying drawings, the same reference numerals represent the same components. In the drawings.

DESCRIPTION OF EMBODIMENTS

Figure 1:
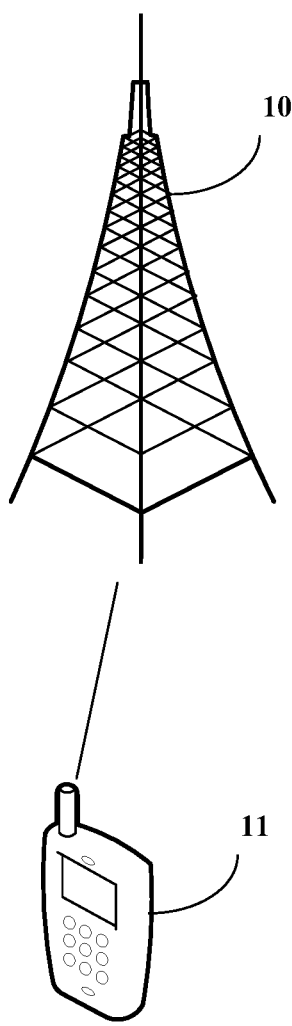
FIG. 1 is a schematic architectural diagram of a wireless communications system according to an embodiment of this disclosure.

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "include", "comprise", or any of their variants in the specification and claims of this application are intended to cover a non-exclusive inclusion, such that a process, a method, a system, a product, or a device that includes a list of steps or units not only includes those elements but also includes other steps or units that are not expressly listed, or further includes steps or units inherent to such process, method, product, or device. Moreover, use of "and/or" in the specification and claims represents at least one of the connected objects. For example, A and/or B means three cases: A alone, B alone, or A and B together.

In the embodiments of this disclosure, terms such as "exemplary" or "for example" are used to represent an example, an instance, or an illustration. Any embodiment or design scheme described as "exemplary" or "for example" in the embodiments of this disclosure should not be construed as being more preferred or advantageous than other embodiments or design schemes. Exactly, use of the word "exemplary" or "for example" or the like is intended to present a related concept in a specific manner.

For a better understanding of the technical solutions of the embodiments of this disclosure, the following technical points are first introduced.

1. DCI Format

In the related technologies, the following DCI formats are defined in NR:

| DCI format | Usage |
| --- | --- |
| 0_0 | Scheduling of physical uplink shared channel (PUSCH) in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of resource preemption indication |
| 2_2 | Transmit power control (TPC) commands for PUCCH and PUSCH |
| 2_3 | TPC commands for sounding reference signal (SRS) |

2. PDSCH Processing Delay of UE

NR supports two types of UE capabilities with different PDSCH processing delays (N1), namely, PDSCH processing capability 1 and PDSCH processing capability 2, and the two capabilities are corresponding to UE processing capability 1 and UE processing capability 2, respectively. The PDSCH processing capability 1 belongs to a basic UE capability, while UE with the PDSCH processing capability 2 has a shorter PDSCH processing delay.

3. PUSCH Preparation Delay of UE

NR supports two types of UE capabilities with different PUSCH preparation delays (N2), namely, PUSCH delay capability 1 and PUSCH delay capability 2, and the two capabilities are corresponding to UE processing capability 1 and UE processing capability 2, respectively. The PUSCH delay capability 1 belongs to a basic UE capability, while UE with PUSCH delay capability 2 has a shorter PUSCH preparation delay.

The following describes the embodiments of this disclosure with reference to the accompanying drawings. The method for data processing, user equipment and network-side device provided in the embodiments of this disclosure may be applied to a wireless communications system. The wireless communications system may be a 5G system, or an evolved long term evolution (eLTE) system, or a later evolved communications system. FIG. 1 is a schematic architectural diagram of a wireless communications system according to an embodiment of this disclosure. As shown in FIG. 1, the wireless communications system may include a network-side device 10 and user equipment, for example, the user equipment is denoted as UE 11, and the UE 11 may communicate with the network-side device 10. In practical application, the connection between the foregoing devices may be a wireless connection. For ease of visually representing the connection relationships between the devices, a solid line is used for illustration in FIG. 1.

It should be noted that the foregoing communications system may include a plurality of UEs, and a network-side device may communicate (transmit signaling or data) with the plurality of UEs.

The network-side device 10 provided in this embodiment of this disclosure may be a base station, and the base station may be a base station commonly used, or may be an evolved NodeB (eNB), or the network-side device 10 may be a device such as a network-side device (such as a next generation NodeB (gNB) or a transmission and reception point (TRP)) in a 5G system, or a cell, and so on.

The user equipment provided in this embodiment of this disclosure may be a mobile phone, a tablet computer, a notebook computer, an ultra-mobile personal computer (UMPC), a netbook, a personal digital assistant (PDA), or the like.

Figure 2:
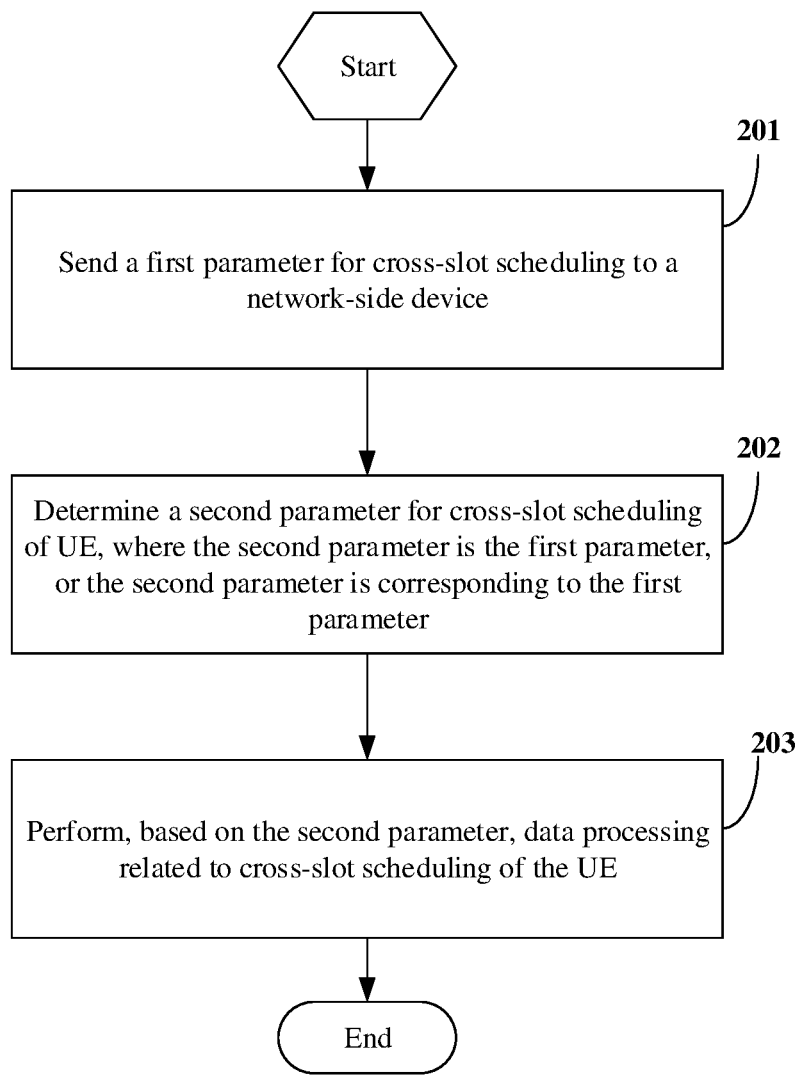
FIG. 2 is a flowchart 1 of a method for data processing according to an embodiment of this disclosure.

Referring to FIG. 2, an embodiment of this disclosure provides another procedure of a method for data processing. The method is executed by UE, and specific steps are as follows:

Step 201: Send a first parameter for cross-slot scheduling to a network-side device.

In this embodiment of this disclosure, optionally, in step 201, the UE sends, to the network-side device, a first parameter for cross-slot scheduling corresponding to one or more DCI formats (or referred to as specific DCI formats). For example, the UE reports only a first parameter for cross-slot scheduling corresponding to a part of DCI formats, where the part of DCI formats may be DCI format 0-0, DCI format 0-1, DCI format 1-0, DCI format 1-1, or other DCI formats.

Alternatively, in step 201, the UE sends, to the network-side device, a first parameter for cross-slot scheduling corresponding to one or more radio network temporary identifiers (RNTI) (or referred to as specific RNTIs). The RNTI includes any one of the following: a cell radio network temporary identifier (C-RNTI), a temporary cell radio network temporary identifier (TC-RNTI), a system information radio network temporary identifier (SI-RNTI), a paging radio network temporary identifier (P-RNTI), a semi-persistent scheduling radio network temporary identifier (SPS-RNTI), a configured scheduling radio network temporary identifier (CS-RNTI), an interruption radio network temporary identifier (INT-RNTI), a transmit power control-sounding reference symbols-radio network temporary identifier (TPC-SRS-RNTI), a transmit power control-physical uplink shared channel-radio network temporary identifier (TPC-PUSCH-RNTI), a transmit power control-physical uplink control channel-radio network temporary identifier (TPC-PUCCH-RNTI), a semi-persistent channel state information radio network temporary identifier (SP-CSI-RNTI), a random access radio network temporary identifier (RA-RNTI), a slot format indication radio network temporary identifier (SFI-RNTI), and the like.

Alternatively, in step 201, the UE sends, to the network-side device, a first parameter for cross-slot scheduling corresponding to one or more PDCCH search space types, where the search space type includes any one of the following: a type 1 common search space (Type 1 CSS), a type 2 common search space (Type 2 CSS), a type 3 common search space (Type 3 CSS), a UE-specific search space, and the like.

Alternatively, in step 201, the UE sends, to the network-side device, a first parameter for cross-slot scheduling corresponding to one or more PDCCH search spaces.

Alternatively, in step 201, the UE sends, to the network-side device, a first parameter for cross-slot scheduling corresponding to one or more control resource sets (CORESET).

Step 202: Determine a second parameter for cross-slot scheduling of the UE, where the second parameter is the first parameter, or the second parameter is corresponding to the first parameter.

Step 203: Perform, based on the second parameter, data processing related to cross-slot scheduling of the UE.

In this embodiment of this disclosure, in step 202, the UE receives the second parameter for cross-slot scheduling from the network-side device, and the second parameter is determined by the network-side device based on the first parameter.

For example, the UE may receive the second parameter in the following manners:

Manner 1: Receive radio resource control (RRC) signaling from the network-side device, where the RRC signaling includes the second parameter;

Manner 2: Receive media access control (MAC) signaling from the network-side device, where the MAC signaling includes the second parameter; and Manner 3: Receive downlink control information (DCI) from the network-side device, where the DCI includes the second parameter.

In this embodiment of this disclosure, the UE reports the first parameter (or referred to as a related parameter) for cross-slot scheduling to the network-side device (for example, a base station), the network-side device configures the second parameter for cross-slot scheduling of the UE by using RRC, MAC or DCI, and the UE performs, based on the second parameter, data processing related to cross-slot scheduling; or the UE performs, based on a reported first parameter, data processing related to cross-slot scheduling.

In this embodiment of this disclosure, before step 202, the method may further include: receiving a first acknowledgment message from the network-side device, where the first acknowledgment message indicates that network-side device receives the first parameter.

In this embodiment of this disclosure, optionally, the first parameter is related to a hardware capability (or referred to as a hardware architecture capability) of the UE and/or a power saving requirement of the UE. For example, when the hardware capability of the UE is a first hardware capability, the reported first parameter is, for example, K0, K1, or K2 whose value is "a"; when the hardware capability of the UE is a second hardware capability, the reported first parameter is, for example, K0, K1, or K2 whose value is "b". That is, the UE can report different first parameters depending on different hardware capabilities. For another example, when the power saving requirement of the UE is a first power saving requirement, the reported first parameter is, for example, K0, K1, or K2 whose value is "c"; when the power saving requirement of the UE is a second power saving requirement, the reported first parameter is, for example, K0, K1, or K2 whose value is "d". That is, the UE can report different first parameters depending on different power saving requirements.

In this embodiment of this disclosure, optionally, the first parameter includes at least one of the following:

a time interval between a PDCCH and a PDSCH scheduled by the PDCCH, where the time interval may be in units of symbol quantity, slot quantity, or milliseconds, and the time interval may be a value of K0, for example, a value range of K0 includes n1, n2, n3, n4, n5, n8, n10, n16, n20, and n32, where n1 indicates 1 slot, and n20 indicates 20 slots;

a time interval between a PDCCH and a PUSCH scheduled by the PDCCH, where the time interval may be in units of symbol quantity, slot quantity, or milliseconds, and the time interval may be a value of K2, for example, a value range of K2 includes n0, n1, n2, n3, n4, n5, n6, n7, n8, n10, n16, n20, and n32, where n0 indicates 0 slot, and n32 indicates 32 slots; and a time interval between a PDSCH and an acknowledgement (ACK) message or a negative acknowledgement (NACK) message on a corresponding PUCCH, where the time interval may be in units of symbol quantity, slot quantity, or milliseconds, and the time interval is a value of K1, for example, a value range of K1 includes 0 to 8 slots.

In this embodiment of this disclosure, optionally, the first parameter includes a UE capability (UE capability) type, where the UE capability type is corresponding to one or more of the following:

a time interval between a PDCCH and a PDSCH scheduled by the PDCCH, where the time interval may be in units of symbol quantity, slot quantity, or milliseconds, and the time interval may be a value of K0; and the time interval is applicable to a scenario in which the PDCCH and the PDSCH scheduled by the PDCCH belong to one carrier and have a same numerology (Numerology) or different numerologies, and also applicable to a scenario in which the PDCCH and the PDSCH scheduled by the PDCCH belong to two different carriers and have a same numerology or different numerologies;

a time interval between a PDCCH and a PUSCH scheduled by the PDCCH, where the time interval may be in units of symbol quantity, slot quantity, or milliseconds, and the time interval may be a value of K2; and the time interval is applicable to a scenario in which the PDCCH and the PUSCH scheduled by the PDCCH belong to one carrier and have a same numerology (Numerology) or different numerologies, and also applicable to a scenario in which the PDCCH and the PUSCH scheduled by the PDCCH belong to two different carriers and have a same numerology or different numerologies; and a time interval between a PDSCH and an acknowledgement (ACK) message or a negative acknowledgement (NACK) message on a corresponding PUCCH, where the time interval may be in units of symbol quantity, slot quantity, or milliseconds, and the time interval may be a value of K1; and the time interval is applicable to a scenario in which the PDSCH and an acknowledgement (ACK)

message or a negative acknowledgement (NACK) message on a corresponding PUCCH belong to one carrier and have a same numerology (Numerology) or different numerologies, and also applicable to a scenario in which the PDSCH and an acknowledgement (ACK) message or a negative acknowledgement (NACK) message on a corresponding PUCCH belong to two different carriers and have a same numerology or different numerologies.

In this embodiment of this disclosure, different UE capability types correspond to different values of K0, K1, and/or K2. The UE only needs to report the UE capability type, and the network-side device can determine corresponding values of K0, K1, and/or K2 based on a preset correspondence, which effectively reduces resources occupied by the UE in comparison to a manner in which the UE directly reports the values of K0, K1, and/or K2.

In this embodiment of this disclosure, the UE reports a related parameter for cross-slot scheduling to the network-side device, and the UE performs, based on a related parameter for cross-slot scheduling sent by the network-side device or the related parameter for cross-slot scheduling reported by the UE, data processing related to cross-slot scheduling, so that data processing related to cross-slot scheduling meets a power saving requirement of the UE, thereby achieving an optimal power saving effect.

Figure 3:
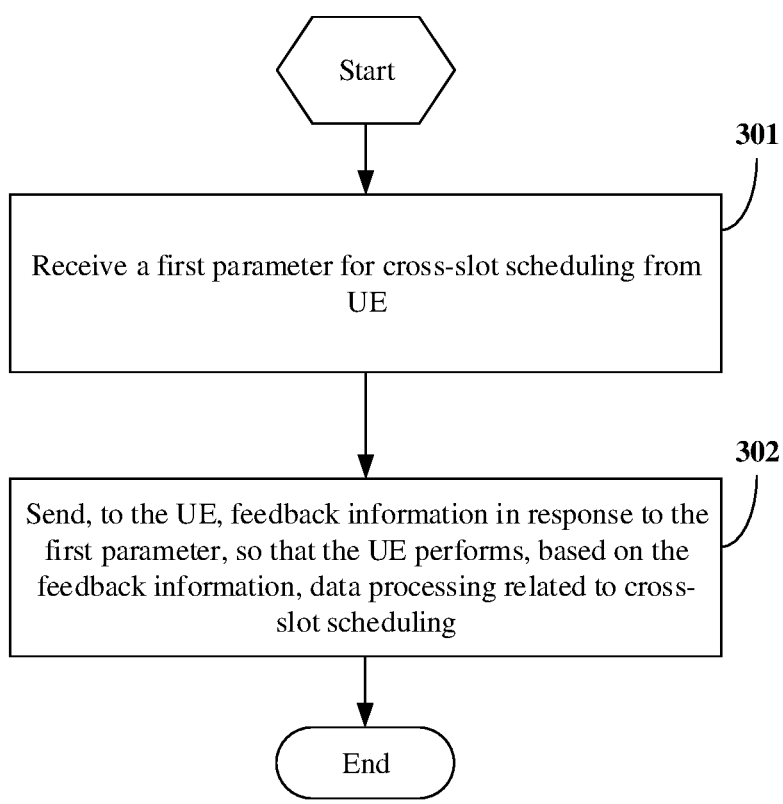
FIG. 3 is a flowchart 2 of a method for data processing according to an embodiment of this disclosure.

Referring to FIG. 3, an embodiment of this disclosure provides another procedure of a method for data processing. The method is executed by a network-side device, and specific steps are as follows:

Step 301: Receive a first parameter for cross-slot scheduling from UE.

In this embodiment of this disclosure, optionally, in step 301, the network-side device receives, from the UE, a first parameter for cross-slot scheduling corresponding to one or more DCI formats. For example, the network-side device receives only a first parameter, sent by the UE, for cross-slot scheduling corresponding to a part of DCI formats, where the part of DCI formats may be DCI format 0-0, DCI format 0-1, DCI format 1-0, DCI format 1-1, or other DCI formats.

Alternatively, in step 301, the network-side device receives, from the UE, a first parameter for cross-slot scheduling corresponding to one or more radio network temporary identifiers RNTIs. The RNTI includes any one of the following: a cell radio network temporary identifier (C-RNTI), a temporary cell radio network temporary identifier (TC-RNTI), a system information radio network temporary identifier (SI-RNTI), a paging radio network temporary identifier (P-RNTI), a semi-persistent scheduling radio network temporary identifier (SPS-RNTI), a configured scheduling radio network temporary identifier (CS-RNTI), an interruption radio network temporary identifier (INT-RNTI), a transmit power control-sounding reference symbols-radio network temporary identifier (TPC-SRS-RNTI), a transmit power control-physical uplink shared channel-radio network temporary identifier (TPC-PUSCH-RNTI), a transmit power control-physical uplink control channel-radio network temporary identifier (TPC-PUCCH-RNTI), a semi-persistent channel state information radio network temporary identifier (SP-CSI-RNTI), a random access radio network temporary identifier (RA-RNTI), a slot format indication radio network temporary identifier (SFI-RNTI), and the like.

Alternatively, in step 301, the network-side device receives, from the UE, a first parameter for cross-slot scheduling corresponding to one or more PDCCH search space types, where the search space type includes any one of the following: a type 1 common search space (Type 1 CSS), a type 2 common search space (Type 2 CSS), a type 3 common search space (Type 3 CSS), a UE-specific search space, and the like.

Alternatively, in step 301, the network-side device receives, from the UE, a first parameter for cross-slot scheduling corresponding to one or more PDCCH search spaces.

Alternatively, in step 301, the network-side device receives, from the UE, a first parameter for cross-slot scheduling corresponding to one or more CORESETs.

Step 302: Send, to the UE, feedback information in response to the first parameter, so that the UE performs, based on the feedback information, data processing related to cross-slot scheduling.

Optionally, the feedback information includes a first acknowledgment message, and the first acknowledgment message indicates that the network-side device has received the first parameter. Alternatively, the feedback information includes a second parameter, and the second parameter is determined by the network-side device based on the first parameter.

In this embodiment of this disclosure, optionally, in step 302, the network-side device may send feedback information in any one of the following manners:

Manner 1: Send RRC signaling to the UE, where the RRC signaling includes the feedback information;

Manner 2: Send MAC signaling to the UE, where the MAC signaling includes the feedback information; and Manner 3: Send DCI to the UE, where the DCI includes the feedback information.

In this embodiment of this disclosure, optionally, the first parameter is related to a hardware capability (or referred to as a hardware architecture capability) of the UE and/or a power saving requirement of the UE. For example, when the hardware capability of the UE is a first hardware capability, the reported first parameter is, for example, K0 whose value is "a"; when the hardware capability of the UE is a second hardware capability, the reported first parameter is, for example, K0 whose value is "b". That is, the UE can report different first parameters depending on different hardware capabilities. For another example, when the power saving requirement of the UE is a first power saving requirement, the reported first parameter is, for example, K0 whose value is "c"; when the power saving requirement of the UE is a second power saving requirement, the reported first parameter is, for example, K0 whose value is "d". That is, the UE can report different first parameters depending on different power saving requirements. The foregoing K0 may alternatively be K1 or K2.

In this embodiment of this disclosure, optionally, the first parameter includes at least one of the following:

a time interval between a PDCCH and a PDSCH scheduled by the PDCCH, where the time interval may be in units of symbol quantity, slot quantity, or milliseconds, and the time interval is a value of K0;

a time interval between a PDCCH and a PUSCH scheduled by the PDCCH, where the time interval may be in units of symbol quantity, slot quantity, or milliseconds, and the time interval is a value of K2; and a time interval between a PDSCH and an acknowledgement (ACK) message or a negative acknowledgement (NACK) message on a corresponding PUCCH, where the time interval may be in units of symbol quantity, slot quantity, or milliseconds, and the time interval is a value of K1.

In this embodiment of this disclosure, optionally, the first parameter includes a UE capability (UE capability) type, where the UE capability type is corresponding to one or more of the following:

a time interval between a PDCCH and a PDSCH scheduled by the PDCCH, where the time interval may be in units of symbol quantity, slot quantity, or milliseconds, and the time interval may be a value of K0, for example, a value range of K0 includes n1, n2, n3, n4, n5, n8, n10, n16, n20, and n32;

a time interval between a PDCCH and a PUSCH scheduled by the PDCCH, where the time interval may be in units of symbol quantity, slot quantity, or milliseconds, and the time interval may be a value of K2, for example, a value range of K2 includes n0, n1, n2, n3, n4, n5, n6, n7, n8, n10, n16, n20, and n32; and a time interval between a PDSCH and an acknowledgement (ACK) message or a negative acknowledgement (NACK) message on a corresponding PUCCH, where the time interval may be in units of symbol quantity, slot quantity, or milliseconds, and the time interval may be a value of K1, for example, a value range of K1 includes 0 to 8 slots.

In this embodiment of this disclosure, different UE capability types correspond to different values of K0, K1, and/or K2. The UE only needs to report the UE capability type, and the network-side device can determine corresponding values of K0, K1, and/or K2 based on a preset correspondence (for example, a correspondence table between the UE capability types and values of K0, K1, and/or K2), which effectively reduces resources occupied by the UE in comparison to a manner in which the UE directly reports the values of K0, K1, and/or K2.

In this embodiment of this disclosure, the network-side device can configure (or reconfigure) a related parameter for cross-slot scheduling of the UE based on a request of the UE by using RRC, MAC or DCI, so that the configured related parameter for cross-slot scheduling can meet a power saving requirement of the UE.

Figure 4:
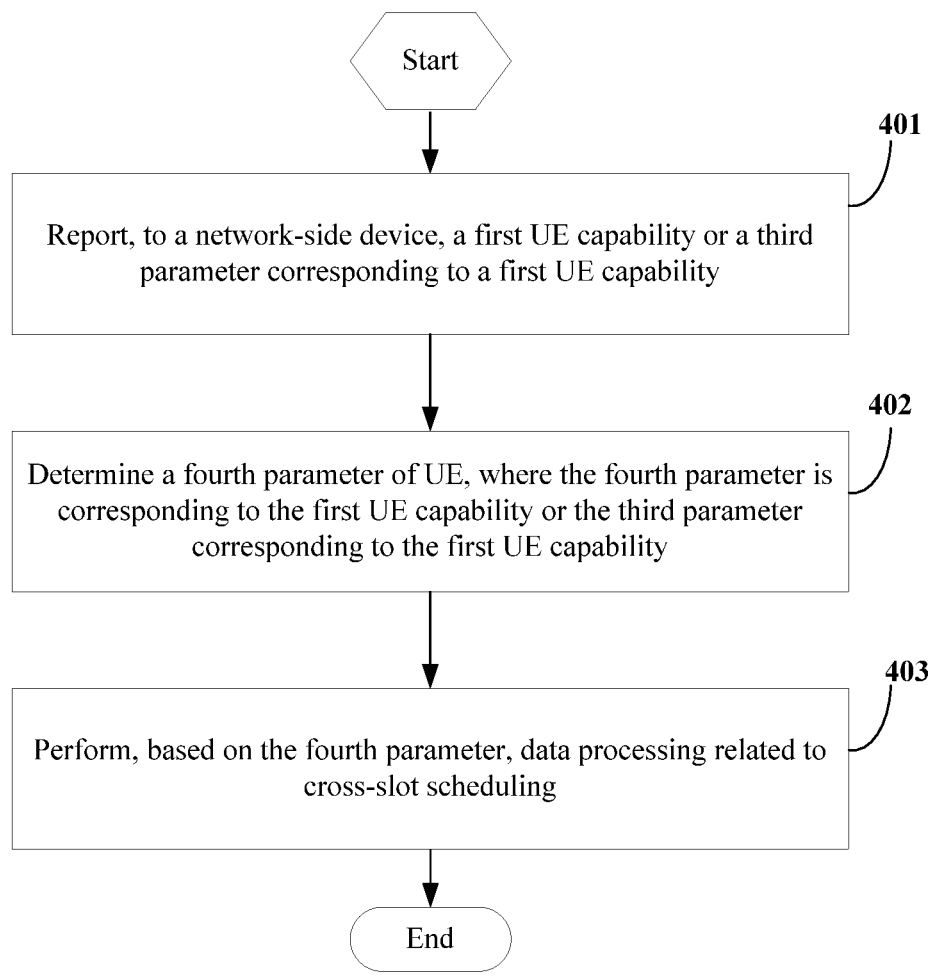
FIG. 4 is a flowchart 3 of a method for data processing according to an embodiment of this disclosure.

Referring to FIG. 4, an embodiment of this disclosure provides yet another procedure of a method for data processing. The method is executed by UE, and specific steps are as follows:

Step 401: Report, to a network-side device, a first UE capability or a third parameter corresponding to a first UE capability. For example, UE having a second UE capability (such as UE processing capability 2) reports, to the network-side device, a first UE capability (such as UE processing capability 1) or a third parameter corresponding to a first UE capability (such as values of N1 and/or N2 corresponding to UE processing capability 1) in some cases, for example, when remaining power of the UE is low.

Step 402: Determine a fourth parameter of the UE, where the fourth parameter is corresponding to the first UE capability or the third parameter corresponding to the first UE capability, and the fourth parameter is at least one of a time interval (for example, K2) between a PDCCH and a PUSCH scheduled by the PDCCH and a time interval (for example, K1) between a PDSCH and an ACK message or a NACK message on a corresponding PUCCH.

Optionally, the fourth parameter for cross-slot scheduling is received from the network-side device, and the fourth parameter is determined by the network-side device based on the first UE capability or the third parameter corresponding to the first UE capability that is reported by the UE. For example, RRC signaling is received from the network-side device, where the RRC signaling includes the fourth parameter; alternatively, MAC signaling is received from the network-side device, where the MAC signaling includes the fourth parameter; alternatively, DCI is received from the network-side device, where the DCI includes the fourth parameter.

Step 403: Perform, based on the fourth parameter, data processing related to cross-slot scheduling.

A current UE capability of the UE is the second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

In this embodiment of this disclosure, UE whose current UE capability is the second UE capability can report the first UE capability or a related parameter of the first UE capability to the network-side device, and then perform, based on a related parameter of the second UE capability configured by the network-side device or the related parameter of the first UE capability reported by the UE, data processing related to cross-slot scheduling, to achieve an optimal power saving effect.

Figure 5:
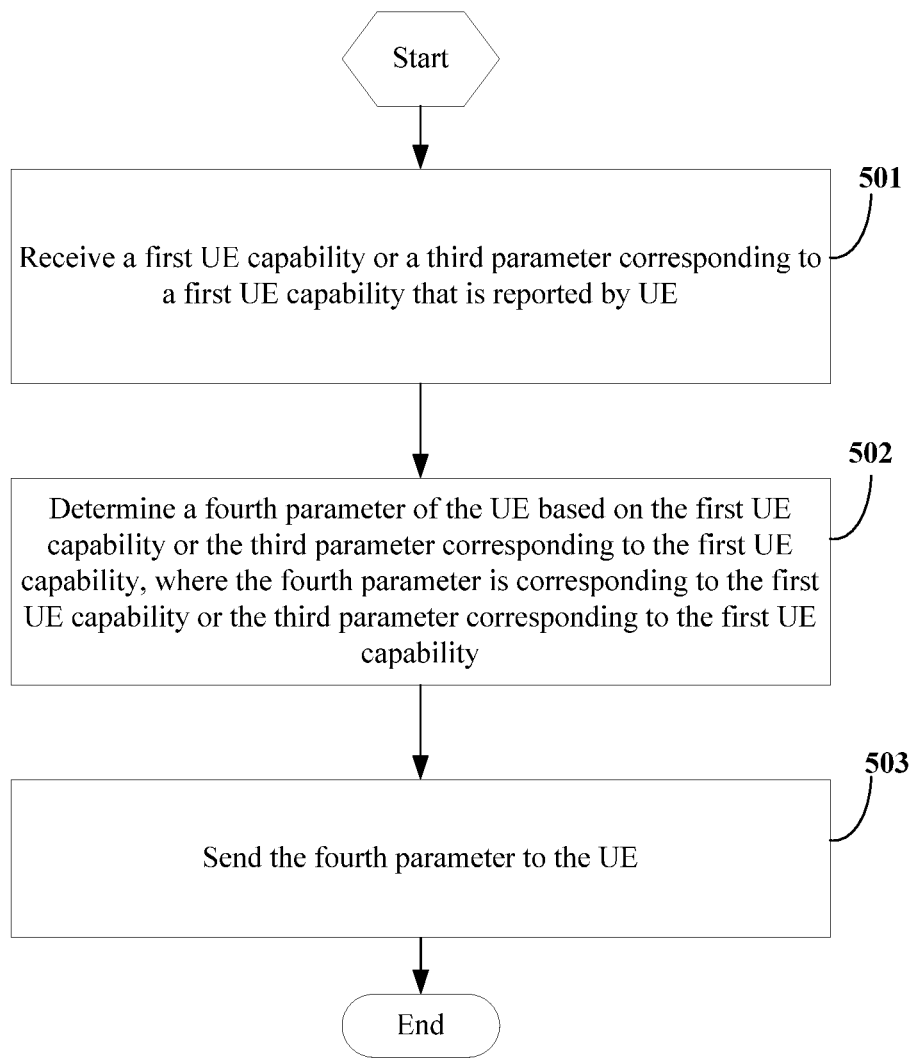
FIG. 5 is a flowchart 4 of a method for data processing according to an embodiment of this disclosure.

Referring to FIG. 5, an embodiment of this disclosure provides still another procedure of a method for data processing. The method is executed by a network-side device, and specific steps are as follows:

Step 501: Receive a first UE capability or a third parameter corresponding to a first UE capability that is reported by UE.

Step 502: Determine a fourth parameter of the UE based on the first UE capability or the third parameter corresponding to the first UE capability, where the fourth parameter is corresponding to the first UE capability or the third parameter corresponding to the first UE capability.

The fourth parameter is at least one of a time interval between a PDCCH and a PUSCH scheduled by the PDCCH and a time interval between a PDSCH and an ACK message or a NACK message on a corresponding PUCCH.

Step 503: Send the fourth parameter to the UE.

A current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

In this embodiment of this disclosure, optionally, after step 501, the method further includes: sending a second acknowledgment message to the UE, where the second acknowledgment message indicates that the network-side device has received the first UE capability or the third parameter corresponding to the first UE capability.

In this embodiment of this disclosure, optionally, in step 503, RRC signaling is sent to the UE, where the RRC signaling includes the fourth parameter; alternatively, MAC signaling is sent to the UE, where the MAC signaling includes the fourth parameter; alternatively, DCI is sent to the UE, where the DCI includes the fourth parameter.

In this embodiment of this disclosure, the network-side device receives the first UE capability or a related parameter of the first UE capability reported by UE whose current UE capability is the second UE capability, and then sends, to the UE, the fourth parameter determined based on the first UE capability or the related parameter of the first UE capability, so that the UE performs, based on the fourth parameter, data processing related to cross-slot scheduling, to achieve an optimal power saving effect.

An embodiment of this disclosure further provides UE. Because a principle of resolving a problem by the UE is similar to the method for data processing in the embodiments of this disclosure, for implementation of the UE, reference may be made to the implementation of the method, and repeated descriptions are omitted.

Figure 6:
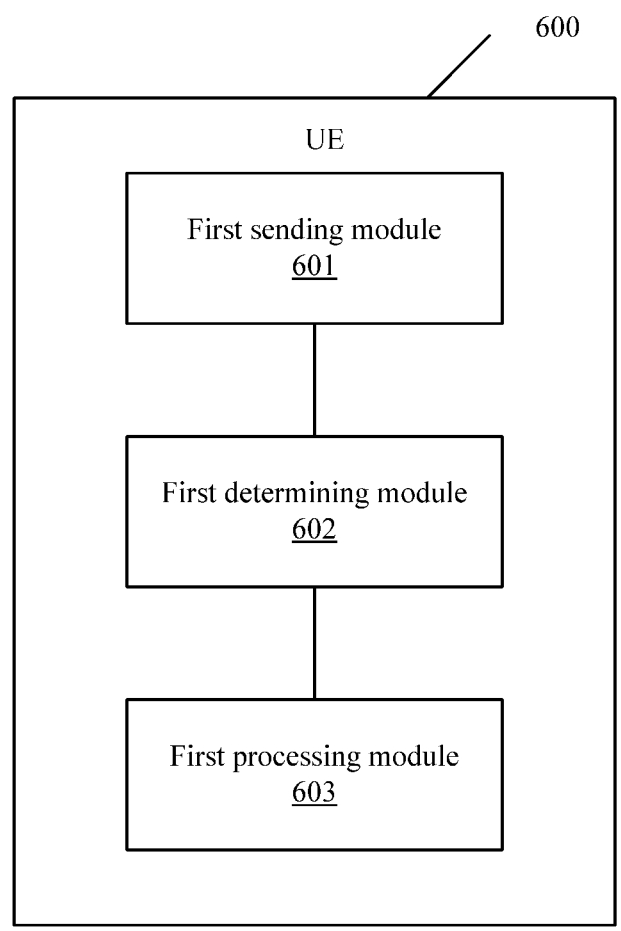
FIG. 6 is a structural diagram 1 of user equipment according to an embodiment of this disclosure.

Referring to FIG. 6, the UE 600 includes:

a first sending module 601, configured to send a first parameter for cross-slot scheduling to a network-side device;

a first determining module 602, configured to determine a second parameter for cross-slot scheduling of the UE, where the second parameter is the first parameter, or the second parameter is corresponding to the first parameter; and a first processing module 603, configured to perform, based on the second parameter, data processing related to cross-slot scheduling.

In this embodiment of this disclosure, optionally, the UE further includes: a first receiving module, configured to receive the second parameter for cross-slot scheduling from the network-side device, where the second parameter is determined by the network-side device based on the first parameter.

In this embodiment of this disclosure, optionally, the first receiving module is further configured to receive a first acknowledgment message from the network-side device, where the first acknowledgment message indicates that the network-side device has received the first parameter.

In this embodiment of this disclosure, optionally, the first receiving module is further configured to: receive radio resource control RRC signaling from the network-side device, where the RRC signaling includes the second parameter; or receive media access control MAC signaling from the network-side device, where the MAC signaling includes the second parameter; or receive downlink control information DCI from the network-side device, where the DCI includes the second parameter.

In this embodiment of this disclosure, optionally, the first parameter is related to a hardware capability of the UE and/or a power saving requirement of the UE.

In this embodiment of this disclosure, optionally, the first sending module is further configured to: send, to the network-side device, a first parameter for cross-slot scheduling corresponding to one or more DCI formats; or send, to the network-side device, a first parameter for cross-slot scheduling corresponding to one or more RNTIs; or send, to the network-side device, a first parameter for cross-slot scheduling corresponding to one or more PDCCH search space types; or send, to the network-side device, a first parameter for cross-slot scheduling corresponding to one or more PDCCH search spaces; or send, to the network-side device, a first parameter for cross-slot scheduling corresponding to one or more CORESETs.

In this embodiment of this disclosure, optionally, the first parameter includes any one of the following:

a time interval between a PDCCH and a physical downlink shared channel PDSCH scheduled by the PDCCH;

a time interval between a PDCCH and a physical uplink shared channel PUSCH scheduled by the PDCCH; and a time interval between a PDSCH and an acknowledgement ACK message or a negative acknowledgement NACK message on a corresponding physical uplink control channel PUCCH.

In this embodiment of this disclosure, optionally, the first parameter includes a UE capability type, where the UE capability type is corresponding to one or more of the following:

a time interval between a PDCCH and a PDSCH scheduled by the PDCCH;

a time interval between a PDCCH and a PUSCH scheduled by the PDCCH; and a time interval between a PDSCH and an ACK message or a NACK message on a corresponding PUCCH.

The UE provided in this embodiment of this disclosure may perform the foregoing method embodiment. An implementation principle and a technical effect of the UE are similar to those of the method embodiment. No more details are described in this embodiment.

An embodiment of this disclosure further provides a network-side device. Because a principle of resolving a problem by the network-side device is similar to the method for data processing in the embodiments of this disclosure, for implementation of the network-side device, reference may be made to the implementation of the method, and repeated descriptions are omitted.

Figure 7:
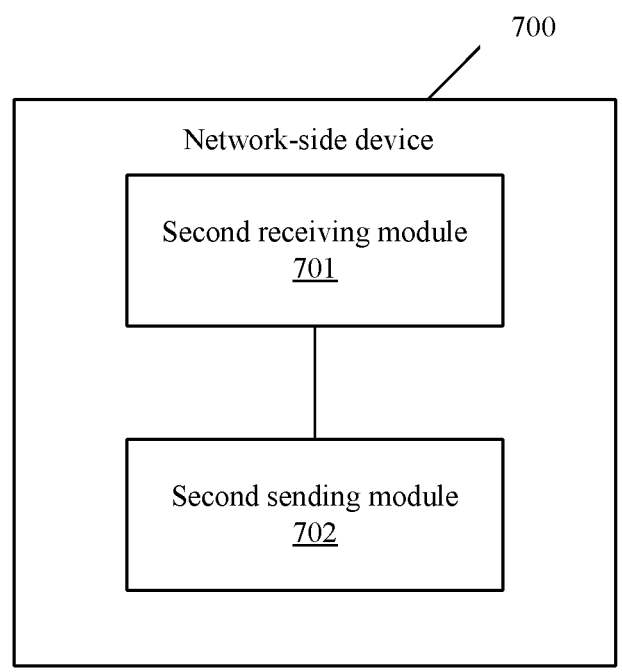
FIG. 7 is a structural diagram 1 of a network-side device according to an embodiment of this disclosure.

Referring to FIG. 7, the network-side device 700 includes:

a second receiving module 701, configured to receive a first parameter for cross-slot scheduling from UE; and a second sending module 702, configured to send, to the UE, feedback information in response to the first parameter, so that the UE performs, based on the feedback information, data processing related to cross-slot scheduling.

In this embodiment of this disclosure, optionally, the feedback information includes a first acknowledgment message, and the first acknowledgment message indicates that the network-side device has received the first parameter.

In this embodiment of this disclosure, optionally, the feedback information includes a second parameter, and the second parameter is determined by the network-side device based on the first parameter.

In this embodiment of this disclosure, optionally, the second sending module is further configured to: send RRC signaling to the UE, where the RRC signaling includes the feedback information; or send MAC signaling to the UE, where the MAC signaling includes the feedback information; or send DCI to the UE, where the DCI includes the feedback information.

In this embodiment of this disclosure, optionally, the first parameter is related to a hardware capability of the UE and/or a power saving requirement of the UE.

In this embodiment of this disclosure, optionally, the second receiving module is further configured to: receive, from the UE, a first parameter for cross-slot scheduling corresponding to one or more DCI formats; or receive, from the UE, a first parameter for cross-slot scheduling corresponding to one or more radio network temporary identifiers RNTIs; or receive, from the UE, a first parameter for cross-slot scheduling corresponding to one or more physical downlink control channel PDCCH search space types; or receive, from the UE, a first parameter for cross-slot scheduling corresponding to one or more physical downlink control channel PDCCH search spaces; or receive, from the UE, a first parameter for cross-slot scheduling corresponding to one or more control resource sets CORESETs.

In this embodiment of this disclosure, optionally, the first parameter includes any one of the following:

a time interval between a PDCCH and a PDSCH scheduled by the PDCCH;

a time interval between a PDCCH and a PUSCH scheduled by the PDCCH; and a time interval between a PDSCH and an ACK message or a NACK message on a corresponding PUCCH.

In this embodiment of this disclosure, optionally, the first parameter includes a UE capability type, where the UE capability type is corresponding to one or more of the following:

a time interval between a PDCCH and a physical downlink shared channel PDSCH scheduled by the PDCCH;

a time interval between a PDCCH and a physical uplink shared channel PUSCH scheduled by the PDCCH; and a time interval between a PDSCH and an acknowledgement ACK message or a negative acknowledgement NACK message on a corresponding physical uplink control channel PUCCH.

The network-side device provided in this embodiment of this disclosure may perform the foregoing method embodiment. An implementation principle and a technical effect of the network-side device are similar to those of the method embodiment. No more details are described in this embodiment.

An embodiment of this disclosure further provides UE. Because a principle of resolving a problem by the UE is similar to the method for data processing in the embodiments of this disclosure, for implementation of the UE, reference may be made to the implementation of the method, and repeated descriptions are omitted.

Figure 8:
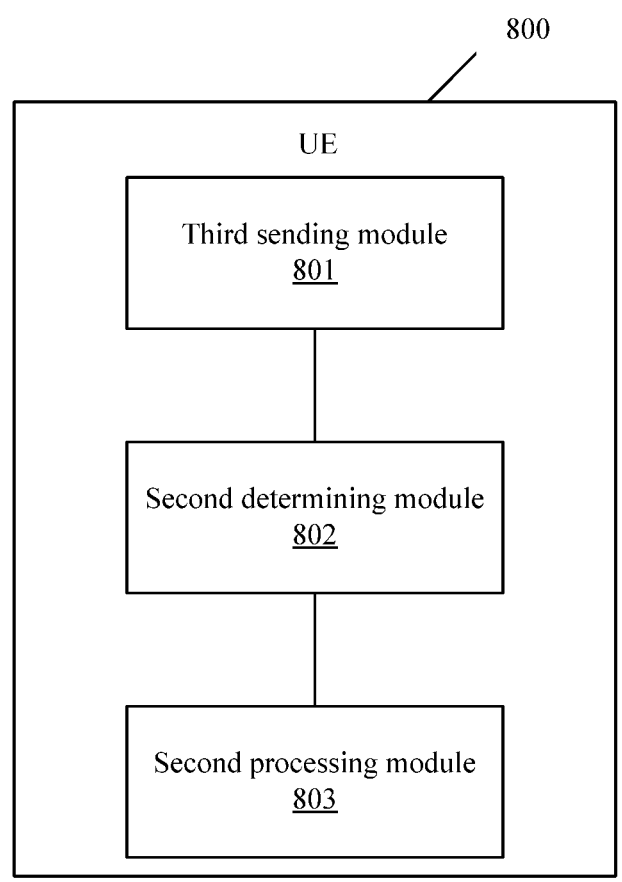
FIG. 8 is a structural diagram 2 of user equipment according to an embodiment of this disclosure.

Referring to FIG. 8, the UE 800 includes:

a third sending module 801, configured to report, to a network-side device, a first UE capability or a third parameter corresponding to a first UE capability;

a second determining module 802, configured to determine a fourth parameter for cross-slot scheduling of the UE, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and a second processing module 803, configured to perform, based on the fourth parameter, data processing related to cross-slot scheduling.

A current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

In this embodiment of this disclosure, optionally, the UE further includes: a third receiving module, configured to receive the fourth parameter for cross-slot scheduling from the network-side device, and the fourth parameter is determined by the network-side device based on the first UE capability or the third parameter corresponding to the first UE capability that is reported by the UE.

In this embodiment of this disclosure, optionally, the third receiving module is further configured to: receive RRC signaling from the network-side device, where the RRC signaling includes the fourth parameter; or receive MAC signaling from the network-side device, where the MAC signaling includes the fourth parameter; or receive DCI from the network-side device, where the DCI includes the fourth parameter.

The UE provided in this embodiment of this disclosure may perform the foregoing method embodiment. An implementation principle and a technical effect of the UE are similar to those of the method embodiment. No more details are described in this embodiment.

An embodiment of this disclosure further provides a network-side device. Because a principle of resolving a problem by the network-side device is similar to the method for data processing in the embodiments of this disclosure, for implementation of the network-side device, reference may be made to the implementation of the method, and repeated descriptions are omitted.

Figure 9:
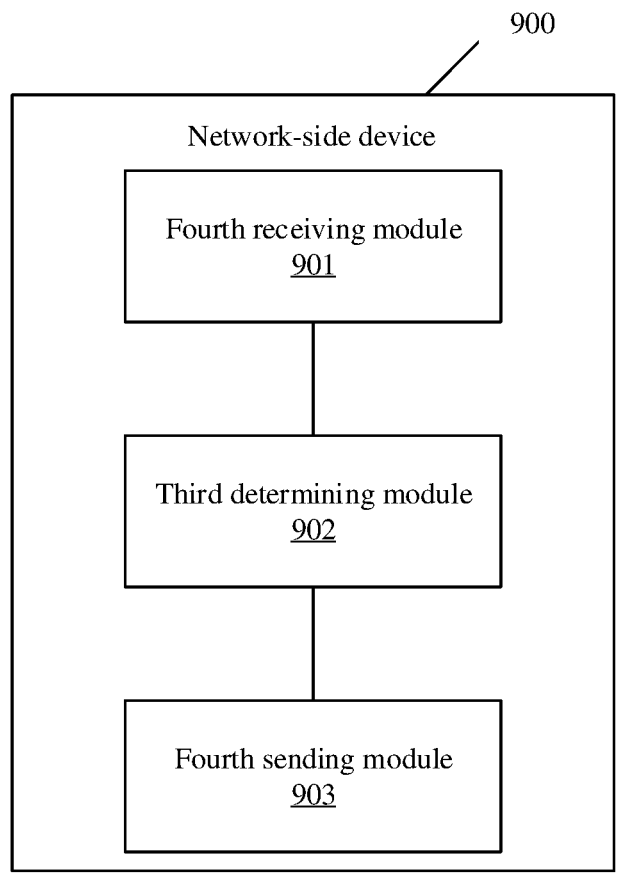
FIG. 9 is a structural diagram 2 of a network-side device according to an embodiment of this disclosure.

Referring to FIG. 9, the network-side device 900 includes:

a fourth receiving module 901, configured to receive a first UE capability or a third parameter corresponding to a first UE capability that is reported by UE;

a third determining module 902, configured to determine a fourth parameter of the UE based on the first UE capability or the third parameter corresponding to the first UE capability, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and a fourth sending module 903, configured to send the fourth parameter to the UE.

A current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

In this embodiment of this disclosure, optionally, the fourth sending module is further configured to send a second acknowledgment message to the UE, where the second acknowledgment message indicates that the network-side device has received the first UE capability or the third parameter corresponding to the first UE capability.

In this embodiment of this disclosure, optionally, the fourth sending module is further configured to: send RRC signaling to the UE, where the RRC signaling includes the fourth parameter; or send MAC signaling to the UE, where the MAC signaling includes the fourth parameter; or send DCI to the UE, where the DCI includes the fourth parameter.

The network-side device provided in this embodiment of this disclosure may perform the foregoing method embodiment. An implementation principle and a technical effect of the network-side device are similar to those of the method embodiment. No more details are described in this embodiment.

Figure 10:
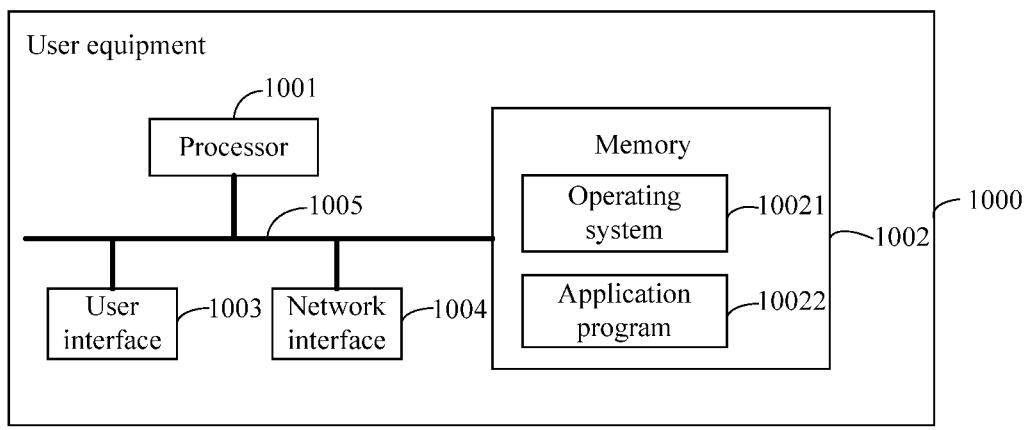
FIG. 10 is a structural diagram 3 of user equipment according to an embodiment of this disclosure.

As shown in FIG. 10, user equipment 1000 shown in FIG. 10 includes at least one processor 1001, a memory 1002, at least one network interface 1004, and a user interface 1003. The components of the user equipment 1000 are coupled together through a bus system 1005. It may be understood that the bus system 1005 is used to implement connection and communication between these components. In addition to a data bus, the bus system 1005 further includes a power bus, a control bus, and a status signal bus. However, for clarity of description, various buses are marked as the bus system 1005 in FIG. 10.

The user interface 1003 may include a display, a keyboard, or a click device (for example, a mouse, a trackball, a touchpad, or a touchscreen).

It may be understood that the memory 1002 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAM may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 1002 of the system and the method described in the embodiments of this disclosure is intended to include but not be limited to these and any other applicable types of memories.

In some embodiments, the memory 1002 stores the following elements: executable modules or data structures, or a subset thereof, or an extended set thereof: an operating system 10021 and an application program 10022.

The operating system 10021 includes various system programs, such as a framework layer, a core library layer, and a driver layer, for implementing various basic services and processing hardware-based tasks. The application program 10022 includes various application programs, such as a media player (Media Player) and a browser (Browser), which are used to implement various application services. A program for implementing the method in the embodiments of this disclosure may be included in the application program 10022.

In this embodiment of this disclosure, a program or instruction stored in the memory 1002 is invoked. Specifically, a program or instruction stored in the application program 10022 is invoked. When the program or instruction is executed, the following steps are implemented: sending a first parameter for cross-slot scheduling to a network-side device; determining a second parameter for cross-slot scheduling of the UE, where the second parameter is the first parameter, or the second parameter is corresponding to the first parameter; and performing, based on the second parameter, data processing related to cross-slot scheduling.

Alternatively, when the program or instruction is executed, the following steps are implemented: reporting, to a network-side device, a first UE capability or a third parameter corresponding to a first UE capability; determining a fourth parameter for cross-slot scheduling of the UE, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and performing, based on the fourth parameter, data processing related to cross-slot scheduling, where a current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

The user equipment provided in this embodiment of this disclosure may perform the foregoing method embodiment. An implementation principle and a technical effect of the user equipment are similar to those of the method embodiment. No more details are described in this embodiment.

Figure 11:
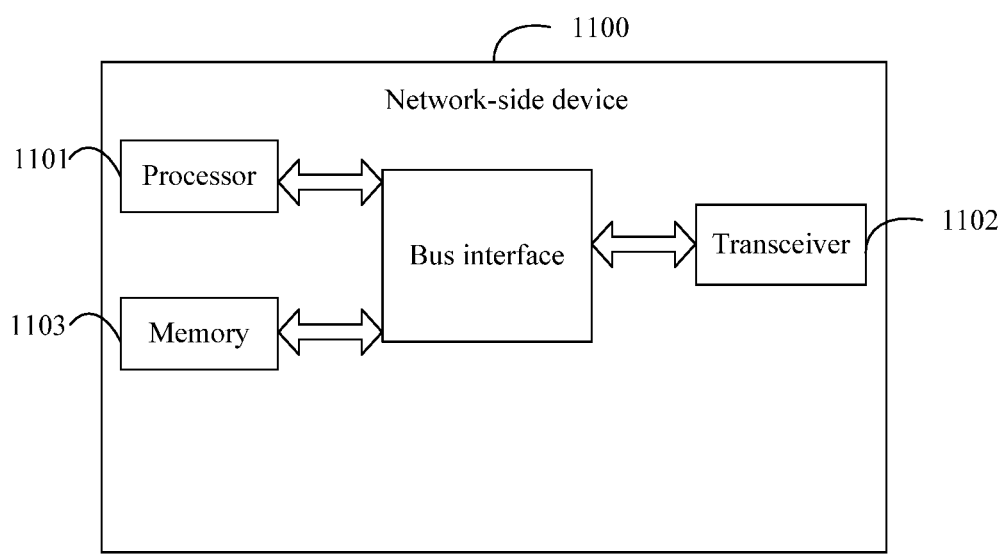
FIG. 11 is a structural diagram 3 of a network-side device according to an embodiment of this disclosure.

Referring to FIG. 11, an embodiment of this disclosure provides another network side device 1100, including a processor 1101, a transceiver 1102, a memory 1103, and a bus interface.

The processor 1101 is responsible for management of a bus architecture and general processing. The memory 1103 may store data used by the processor 1101 to perform an operation.

In this embodiment of this disclosure, the network side device 1100 may further include a computer program that is stored in the memory 1103 and capable of running on the processor 1101. When the computer program is executed by the processor 1101, the following steps are implemented: receiving a first parameter for cross-slot scheduling from UE; and sending, to the UE, feedback information in response to the first parameter, so that the UE performs, based on the feedback information, data processing related to cross-slot scheduling.

Alternatively, when the computer program is executed by the processor 1101, the following steps are implemented: receiving a first UE capability or a third parameter corresponding to a first UE capability that is reported by UE; determining a fourth parameter of the UE based on the first UE capability or the third parameter corresponding to the first UE capability, where the fourth parameter is corresponding to the first UE capability or the third parameter corresponding to the first UE capability, and the fourth parameter is at least one of a time interval between a PDCCH and a PUSCH scheduled by the PDCCH and a time interval between a PDSCH and an ACK message or a NACK message on a corresponding PUCCH; and sending the fourth parameter to the UE, where a current UE capability of the UE is a second UE capability, the third parameter corresponding to the first UE capability is a PUSCH preparation delay and/or a PDSCH processing delay, and a PUSCH preparation delay corresponding to the first UE capability is greater than a PUSCH preparation delay corresponding to the second UE capability, or a PDSCH processing delay corresponding to the first UE capability is greater than a PDSCH processing delay corresponding to the second UE capability.

In FIG. 11, the bus architecture may include any quantity of interconnected buses and bridges, and specifically connects together various circuits of one or more processors represented by the processor 1101 and a memory represented by the memory 1103. The bus architecture may further connect, for example, a peripheral device or a voltage stabilizer to various other circuits such as a power management circuit. These are well known in the art, and therefore are not further described in this embodiment of this disclosure. The bus interface provides interfaces. The transceiver 1102 may be a plurality of elements, including a transmitter and a receiver, and provides units configured to perform communication with various other apparatuses over a transmission medium.

The network-side device provided in this embodiment of this disclosure may perform the foregoing method embodiment. An implementation principle and a technical effect of the network-side device are similar to those of the method embodiment. No more details are described in this embodiment.

An embodiment of this disclosure further provides a computer-readable storage medium. The computer-readable storage medium stores a computer program, and when the computer program is executed by a processor, the steps of the method for data processing according to any one of the foregoing embodiments are implemented.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. When software is used for implementation, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

A person skilled in the art should understand that the embodiments of this disclosure may be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a disk memory, a CD-ROM, an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams, or a combination of a process and/or a block in the flowcharts and/or the block diagrams. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this disclosure without departing the spirit and scope of this disclosure. This disclosure is intended to cover these modifications and variations provided that they fall within the scope of protection defined by the following claims and their equivalent technologies of this disclosure.

What is claimed is:

1. A method for data processing, applied to user equipment (UE) and comprising:
    sending a first parameter used for power saving for cross-slot scheduling to a network-side device;
    receiving a second parameter for cross-slot scheduling of the UE from the network-side device, wherein the second parameter is the first parameter, or the second parameter is corresponding to the first parameter; and
    performing, based on the second parameter, data processing related to cross-slot scheduling;
    wherein the first parameter comprises:
    a time interval between a physical downlink control channel (PDCCH) and a physical downlink shared channel (PDSCH) scheduled by the PDCCH;
    a time interval between a PDCCH and a physical uplink shared channel (PUSCH) scheduled by the PDCCH.

2. The method according to claim 1, wherein the determining a second parameter for cross-slot scheduling of the UE, wherein the second parameter is corresponding to the first parameter comprises:
    receiving the second parameter for cross-slot scheduling from the network-side device, wherein the second parameter is determined by the network-side device based on the first parameter.

3. The method according to claim 1, further comprising:
receiving a first acknowledgment message from the network-side device, wherein the first acknowledgment message indicates that the network-side device has received the first parameter.

4. The method according to claim 2, wherein the receiving the second parameter for cross-slot scheduling from the network-side device comprises any one of the following:
receiving radio resource control (RRC) signaling from the network-side device, wherein the RRC signaling comprises the second parameter;
receiving media access control (MAC) signaling from the network-side device, wherein the MAC signaling comprises the second parameter; and
receiving downlink control information (DCI) from the network-side device, wherein the DCI comprises the second parameter.

5. The method according to claim 1, wherein the first parameter is related to a hardware capability of the UE and/or a power saving requirement of the UE.

6. The method according to claim 1, wherein the sending a first parameter for cross-slot scheduling to a network-side device comprises any one of the following:
sending, to the network-side device, a first parameter for cross-slot scheduling corresponding to one or more DCI formats;
sending, to the network-side device, a first parameter for cross-slot scheduling corresponding to one or more radio network temporary identifiers (RNTIs);
sending, to the network-side device, a first parameter for cross-slot scheduling corresponding to one or more physical downlink control channel (PDCCH) search space types;
sending, to the network-side device, a first parameter for cross-slot scheduling corresponding to one or more physical downlink control channel (PDCCH) search spaces; and
sending, to the network-side device, a first parameter for cross-slot scheduling corresponding to one or more control resource sets (CORESETs).

7. The method according to claim 1, wherein the first parameter further comprises:
a time interval between a PDSCH and an acknowledgement (ACK) message or a negative acknowledgement (NACK) message on a physical uplink control channel (PUCCH) corresponding with the PDSCH.

8. The method according to claim 1, wherein the first parameter comprises a UE capability type, and the UE capability type is corresponding to one or more of the following:
a time interval between a PDCCH and a PDSCH scheduled by the PDCCH;
a time interval between a PDCCH and a PUSCH scheduled by the PDCCH; and
a time interval between a PDSCH and an acknowledgement (ACK) message or a negative acknowledgement (NACK) message on a PUCCH corresponding with the PDSCH.

9. A user equipment (UE), comprising a processor, a memory, and a computer program stored in the memory and capable of running on the processor, wherein the computer program is executed by the processor to implement:
sending a first parameter used for power saving for cross-slot scheduling to a network-side device;

receiving a second parameter for cross-slot scheduling of the UE from the network-side device, wherein the second parameter is the first parameter, or the second parameter is corresponding to the first parameter; and
performing, based on the second parameter, data processing related to cross-slot scheduling;
wherein the first parameter comprises:
a time interval between a physical downlink control channel (PDCCH) and a physical downlink shared channel (PDSCH) scheduled by the PDCCH;
a time interval between a PDCCH and a physical uplink shared channel (PUSCH) scheduled by the PDCCH.

10. The UE according to claim 9, wherein the computer program is further executed by the processor to implement:
receiving the second parameter for cross-slot scheduling from the network-side device, wherein the second parameter is determined by the network-side device based on the first parameter.

11. The UE according to claim 9, the computer program is further executed by the processor to implement:
receiving a first acknowledgment message from the network-side device, wherein the first acknowledgment message indicates that the network-side device has received the first parameter.

12. The UE according to claim 10, wherein the receiving the second parameter for cross-slot scheduling from the network-side device comprises any one of the following:
receiving radio resource control (RRC) signaling from the network-side device, wherein the RRC signaling comprises the second parameter;
receiving media access control (MAC) signaling from the network-side device, wherein the MAC signaling comprises the second parameter; and
receiving downlink control information (DCI) from the network-side device, wherein the DCI comprises the second parameter.

13. The UE according to claim 9, wherein the first parameter is related to a hardware capability of the UE and/or a power saving requirement of the UE.

14. The UE according to claim 9, wherein the sending a first parameter for cross-slot scheduling to a network-side device comprises any one of the following:
sending, to the network-side device, a first parameter for cross-slot scheduling corresponding to one or more DCI formats;
sending, to the network-side device, a first parameter for cross-slot scheduling corresponding to one or more radio network temporary identifiers (RNTIs);
sending, to the network-side device, a first parameter for cross-slot scheduling corresponding to one or more physical downlink control channel (PDCCH) search space types;
sending, to the network-side device, a first parameter for cross-slot scheduling corresponding to one or more physical downlink control channel (PDCCH) search spaces; and
sending, to the network-side device, a first parameter for cross-slot scheduling corresponding to one or more control resource sets (CORESETs).

15. The UE according to claims 9, wherein the first parameter further comprises:
a time interval between a PDSCH and an acknowledgement (ACK) message or a negative acknowledgement (NACK) message on a physical uplink control channel (PUCCH) corresponding with the PDSCH.

16. The UE according to claim 9, wherein the first parameter comprises a UE capability type, and the UE capability type is corresponding to one or more of the following:

a time interval between a PDCCH and a PDSCH scheduled by the PDCCH;

a time interval between a PDCCH and a PUSCH scheduled by the PDCCH; and a time interval between a PDSCH and an acknowledgement (ACK) message or a negative acknowledgement (NACK) message on a PUCCH corresponding with the PDSCH.

17. A network-side device, comprising a processor, a memory, and a computer program stored in the memory and capable of running on the processor, wherein the computer program is executed by the processor to implement:

receiving a first parameter used for power saving for cross-slot scheduling from a user equipment (UE); and sending, to the UE, feedback information in response to the first parameter, so that the UE performs, based on the feedback information, data processing related to cross-slot scheduling;

wherein the first parameter comprises:

a time interval between a physical downlink control channel (PDCCH) and a physical downlink shared channel (PDSCH) scheduled by the PDCCH;

a time interval between a PDCCH and a physical uplink shared channel (PUSCH) scheduled by the PDCCH.

18. The network-side device according to claim 17, wherein the sending, to the UE, feedback information in response to the first parameter comprises any one of the following:

sending radio resource control (RRC) signaling to the UE, wherein the RRC signaling comprises the feedback information;

sending media access control (MAC) signaling to the UE, wherein the MAC signaling comprises the feedback information; and sending downlink control information (DCI) to the UE, wherein the DCI comprises the feedback information;

wherein the feedback information comprises:

a first acknowledgment message, wherein the first acknowledgment message indicates that the network-side device has received the first parameter; or the feedback information comprises a second parameter, and the second parameter is determined by the network-side device based on the first parameter.

19. The network-side device according to claim 17, wherein the first parameter is related to a hardware capability of the UE and/or a power saving requirement of the UE.

20. The network-side device according to claim 17, wherein the first parameter further comprises:

a time interval between a PDSCH and an acknowledgement (ACK) message or a negative acknowledgement (NACK) message on a corresponding PUCCH.

* * * * *